United States Patent [19]

Hoxmeier

[11] Patent Number: 5,276,095
[45] Date of Patent: Jan. 4, 1994

[54] STAR BLOCK COPOLYMERS OF VINYL AROMATIC HYDROCARBONS AND POLYDIMETHYLSILOXANE AND METHOD OF SYNTHESIS

[75] Inventor: Ronald J. Hoxmeier, Houston, Tex.

[73] Assignee: Shell Oil Company, Houston, Tex.

[21] Appl. No.: 996,285

[22] Filed: Dec. 23, 1992

[51] Int. Cl.$^5$ .............................................. C08L 83/10
[52] U.S. Cl. .................................. 525/105; 525/100; 525/106
[58] Field of Search ........................ 525/100, 105, 106

[56] References Cited

U.S. PATENT DOCUMENTS

| | | | |
|---|---|---|---|
| 3,051,684 | 8/1962 | Morton et al. | 525/14 |
| 3,483,270 | 12/1969 | Bostick | 525/479 |
| 3,644,322 | 2/1972 | Farrer | 525/385 |
| 3,665,052 | 5/1972 | Saam et al. | 525/479 |
| 3,691,257 | 9/1972 | Kendrick | 525/479 |
| 3,760,030 | 9/1973 | Dean | 525/479 |
| 3,928,490 | 12/1975 | Hergertruther | 525/479 |
| 4,143,089 | 3/1979 | Martin . | |
| 4,148,838 | 4/1979 | Martin . | |
| 4,263,401 | 4/1981 | Chaumont et al. . | |
| 4,273,896 | 6/1981 | Martin . | |
| 4,768,750 | 11/1990 | Eichenauer et al. | 525/479 |

OTHER PUBLICATIONS

Eschwax et al, Polymer, vol. 16 pp. 180–184 (Mar. 1975).
J. C. Saam, D. J. Gordon, S. Lindsey, *Macromolecules*, 3 (1), pp. 1–4 (1970).
I. Jansen, G. Lohmann, K. Rühlmann, *Siloxanes with Functional Groups, V. Long-term Stabilization of Polymers. I. Preparation and Properties of Styrene-Siloxane Block Copolymers*, Plaste Kautsch, 31(12), pp. 441–447.
P. Bajaj, S. K. Varshney, A. Misra, *Block Copolymers of Polystyrene and Poly(Dimethyl Siloxane). I. Synthesis and Characterization*, J. of Poly. Sci.: Polymer Chem. Ed., vol. 18, (1980) pp. 295–309.

Primary Examiner—Ralph H. Dean
Attorney, Agent, or Firm—Donald F. Haas

[57] ABSTRACT

A star block copolymer comprised of vinyl aromatic hydrocarbon and/or conjugated diene polymer arms and polydimethylsiloxane arms radiating outwardly from a polyalkenyl aromatic coupling agent core is produced by first anionically polymerizing a vinyl aromatic hydrocarbon and/or a conjugated diene to produce living polymer arms, reacting the living polymer arms with a polyalkenyl aromatic coupling agent to couple the arms thereto, polymerizing this coupled product with hexa-methylcyclotrisiloxane in the presence of a polar promoter and then terminating the polymerization.

12 Claims, No Drawings

STAR BLOCK COPOLYMERS OF VINYL AROMATIC HYDROCARBONS AND POLYDIMETHYLSILOXANE AND METHOD OF SYNTHESIS

BACKGROUND OF THE INVENTION

This invention relates to star block copolymers of vinyl aromatic hydrocarbons and/or conjugated dienes and polydimethylsiloxane. The invention also relates to a process for making such block copolymers.

Linear block copolymers of polystyrene and polydimethylsiloxane have been synthesized, both by graft and block copolymerization. In block copolymerization of such linear polymers, polystyrene is produced by anionic polymerization with an organo lithium promoter and the living polymer (PS$^-$Li$^+$) created thereby is reacted with hexamethylcyclotrisiloxane, (Me$_2$SiO)$_3$, in the presence of a polar promoter wherein a block of polydimethylsiloxane grows on the end of the living vinyl aromatic hydrocarbon polymer block.

Such polymers incorporate the strength of vinyl aromatic hydrocarbons such as polystyrene and the high flexibility of polydimethylsiloxane and its extremely low solubility parameter and Tg compared with polystyrene. These polymers are useful for impact modification of engineering thermoplastics and surface-inactive coatings. The present invention produces star block copolymers of vinyl aromatic hydrocarbons and/or conjugated dienes and polydimethylsiloxane which can be used for similar purposes but have much lower viscosity than linear analogs of comparable molecular weight. As such, they can be manufactured at higher solids level in solution (and thus are cheaper) and they will process more easily for end use applications.

SUMMARY OF THE INVENTION

The present invention is a star block copolymer which is comprised of arms of a polymer of a vinyl aromatic hydrocarbon and/or a conjugated diene (anionically polymerized monomers), arms of polydimethylsiloxane and a core of a polyalkenyl aromatic coupling agent from which both sets of arms radiate outwardly. The preferred vinyl aromatic hydrocarbon is styrene, the preferred diene is isoprene and the preferred coupling agent is divinylbenzene.

The present invention also encompasses a process for making the block copolymers discussed above. This process comprises first anionically polymerizing a vinyl aromatic hydrocarbon and/or a conjugated diene, or both, to produce living polymer arms and then reacting these living polymer arms with a polyalkenyl aromatic coupling agent to couple the arms thereto. The next step is polymerizing the coupled product with hexamethylcyclotrisiloxane in the presence of polar promoters such as cyclic ethers, di-ethers and polyamines such as N,N,N',N'-tetra-methylethylenediamine. The final step is terminating the polymerization to produce a star block copolymer with polyvinyl aromatic hydrocarbon and/or conjugated diene arms, or both, and polydimethylsiloxane arms.

DETAILED DESCRIPTION OF THE INVENTION

As is well known, polymers containing aromatic unsaturation can be prepared by polymerizing vinyl aromatic hydrocarbon and/or conjugated diene monomers. These polymers will hereinafter be referred to collectively as anionically polymerized polymers. The anionically polymerized polymer blocks or arms which are present in the star block copolymer of the present invention may be all polyvinyl aromatic hydrocarbon homopolymer arms. However, they may also be all polydiene homopolymer arms or they may be block copolymer arms comprised of blocks of polyvinyl aromatic hydrocarbons and conjugated dienes. These copolymers arms may also be tapered. Further, the anionically polymerized polymers arms may be random copolymers of vinyl aromatic hydrocarbons and conjugated dienes. When these copolymer arms are coupled to the coupling agent, they may be coupled through the polyvinyl aromatic hydrocarbon block or the polydiene block. Thus, some of the possible structures for the arms of the star block copolymer are: A, B, AB, BA, ABA, BAB, ABAB, etc. where A refers to a vinyl aromatic hydrocarbon block and B refers to a diene block. These polymers may be prepared using anionic initiators or polymerization catalysts. Such polymers may be prepared using bulk, solution or emulsion techniques. In any case, the polymer will generally, be recovered as a solid such as a crumb, a powder, a pellet or the like.

In general, when solution anionic techniques are used, polymers of vinyl aromatic hydrocarbons are prepared by contacting the monomer to be polymerized simultaneously or sequentially with an anionic polymerization initiator such Group IA metals, their alkyls, amides, silanolates, naphthalides, biphenyls and anthracenyl derivatives. It is preferable to use an organo alkali metal (such as sodium or potassium) compound in a suitable solvent at a temperature within the range from $-150°$ C. to $300°$ C., preferably at a temperature within the range from $0°$ C. to $100°$ C. Particularly effective anionic polymerization initiators are organo lithium compounds having the general formula:

$$RLi_n$$ 

wherein:

R is an aliphatic, cycloaliphatic, aromatic or alkyl-substituted aromatic hydrocarbon radical having from 1 to 20 carbon atoms; and n is an integer of 1–4.

Vinyl aromatic hydrocarbons which may be polymerized include vinyl aryl compounds such as styrene, various alkyl-substituted styrenes, alkoxysubstituted styrenes, 2-vinylpyridine, 4-vinylpyridine, vinylnaphthalene, alkyl-substituted vinyl napthalenes and the like. Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl1,3-octadiene and the like. Conjugated diolefins containing from 4 to about 8 carbon atoms are preferred for use in such polymers.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

A vinyl aromatic hydrocarbon, preferably polystyrene, and/or a conjugated diene, preferably isoprene, may be polymerized as described above. When the polymerization is complete, living polymer blocks or arms are present in the polymerization mixture. This can be referred to as PS-Li$^+$ (for convenience hereafter, the living polymer arms will be referred to as styrene but the description is applicable to other vinyl aromatic hydrocarbons and also to conjugated dienes). These living polymer arms are then reacted with a multifunctional coupling agent, preferably at a temperature of 40 to 100° C. and molar ratio of coupling agent to living polymer arms is from 1:1 to 6:1. If a diene is included in this polymer arm, it may be polymerized first to form a block and then the PS block is formed, depending upon whether it is desired to have the styrene or diene block coupled directly to the coupling agent.

The coupling agent is a polyalkenyl aromatic coupling agent. The most preferred coupling agent is divinylbenzene because it is readily available in commercial quantities. Polyalkenyl aromatic coupling agents capable of forming star shaped polymers are known in the art. See generally, Canadian Patent No. 716,645 and U.S. Pat. Nos. 4,010,226 and 3,985,830 which are herein incorporated by reference. A detailed description of a variety of such coupling agents is found in U.S. Pat. No. 4,391,949 which is herein incorporated by reference. Examples of suitable polyvinyl aromatic compounds are 1,2-divinylbenzene, 1,3-divinyl-benzene, 1,4-divinylbenzene, 1,2,4trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,6-tributylnaphthalene,2,2'-divinyl-4'-ethyl-4'-propylbiphenyland the like. Divinyl aromatic hydrocarbons containing up to 26 carbon atoms per molecule are preferred for employment according to this invention. As stated above, particularly preferred is divinylbenzene in either its ortho, meta or para isomer. Commercial divinylbenzene which is a mixture of said isomers is also quite satisfactory.

Reaction of the living polymer arms with the coupling agent will produce a polymer with the polymer arms coupled to the coupling agent. When the polymer is polystyrene and the coupling agent is divinylbenzene, this species can be represented as $(PS)_n\text{-DVB}^{-n}Li^{+n}$. Thus, this species remains a living polymer which can be further reacted.

The next step in the process is to react the coupled polymer species with hexamethylcyclotrisiloxane, $(Me_2SiO)_3$, in the presence of a polar promoter. The promoter can be cyclic ethers, di-ethers and diamines such as tetrahydrofuran, diethylglyme or N,N,N',N'-tetramethylethylenediamine. Its purpose is to decrease the reaction time of the hexamethylcyclotrisiloxane with the living coupled polymer species. Preferably, this reaction is carried out at a temperature of from 30° C. to 120° C., the concentration of the hexamethyltrisiloxane is from 1 to 25% by weight and the amount of promoter used ranges from 100 ppm to essentially 100% by weight (i.e., the polar promoter is used as solvent). The temperature range is important because higher temperatures cause more rapid reaction. The promoter concentration range is important for the same reason.

In this step, polydimethylsiloxane polymer arms grow outwardly from the coupling agent core at the active sites which were left after the first coupling reaction. Another way is to put in a portion of the monomer to initiate polymerization for 0.5 to 4 hours at 50° to 80° C. and then add the rest and react at 60° to 120° C. for 1 to 4 hours. This is advantageous because it minimizes die-out from impurities in the siloxane monomer. The final step is termination of polymerization. This can be accomplished by adding trimethylchlorosilane to the polymerization solution. Other methods of termination include alcohols, carboxylic acids and other acidic proton sources.

Die out of the polymerization is very common when linear polymers of this type are made. This occurs because the polymerization reaction to produce the polydimethylsiloxane arms is very slow and because of impurities in the siloxane monomers. Die out leads to chain terminated homopolystyrene. In the present system, die out will lead only to fewer polydimethylsiloxane arms per molecule and will not form homopolystyrene. This is important because for many applications homopolystyrene impurities are detrimental to desired properties.

The star polymers of the present invention will have at least 3 arms and will generally have from 10 to 35 anionically polymerized arms because this is typical for the range of DVB:Li ratios used in coupling, and at least 3 and generally from 10 to 35 polydimethyl siloxane arms because this reaction generally yields one polydimethyl siloxane arm per anionically polymerized arm. Preferably, there will be 15 to 20 arms of each type because this is typical for a 3:1 DVB:Li ratio which is commonly used. These polymers are useful in impact modification of engineering thermoplastics, surface-inactive coatings, and low energy surfaces.

EXAMPLE 25 grams of styrene (0.24 moles), 355 grams of cyclohexane and 3.57 millimeters of a 1.4 molar solution (5 remoles) of sec-butyl lithium in cyclohexane were added to a 1 liter bottle reactor. The mixture was polymerized for 30 minutes at 50° C. A mixture of divinylbenzene (15 mmoles) and styrene (60 remoles) was added to the polymerization mixture. The amount of the divinylbenzene styrene mixture added was sufficient to make the divinyl-benzene to lithium ratio 3:1. The coupling reaction was allowed to proceed at 50° C. for 30 minutes after the addition of the divinylbenzene mixture. The solution became reddish orange.

A preprepared solution of concentrated $(Me_2SiO)_3$/cyclohexane/1,2-diethoxyethane (the promoter) was added to the coupled polymer mixture. 20 grams of this solution which was 50% by weight $(Me_2SiO)_3$ and 10% by weight 1,2-diethoxyethane were added. The reaction was allowed to take place at 60° C. until the reddish orange styryl lithium color disappeared. The color of the solution lightened very slowly after heating for 2 hours.

Next, 305 grams of a second prepared $(Me_2SiO)_3$/cyclohexane/1,2diethoxyethane solution (22% by weight $(Me_2SiO)_3$; 2% by weight 1,2-diethoxyethane] were added to the one liter reactor. These components were reacted at 70° C. for 3 hours in the presence of a total amount of 1% by weight 1,2-diethoxyethane. The final solution had an opalescent color. The polymerization was terminated by adding 1.6 grams (15 millimoles) of trimethylsilicon chloride.

The polystyrene/polydimethylsiloxane star polymer was determined by gel permeation chromatography (GPC) to have polystyrene blocks of 5,000 peak molecular weight and was 27% by weight polydimethylsiloxane as determined by NMR. The overall molecular weight of the star polymer as determined by GPC and NMR was about 125,000.

I claim:

1. A star block copolymer comprised of
   (a) arms of anionically polymerized monomer(s) selected from the group consisting of vinyl aromatic hydrocarbons, conjugated dienes and mixtures thereof,
   (b) arms of polydimethyl siloxane, and
   (c) a core of a polyalkenyl aromatic coupling agent from which the arms of (a) and (b) radiate outwardly.

2. The star block copolymer of claim 1 wherein there are 10 to arms of (a) and 10 to 35 arms of (b).

3. The star block copolymer of claim 2 wherein there are 15 to arms of (a) and 15 to 25 arms of (b).

4. The star block copolymer of claim 1 wherein the vinyl aromatic hydrocarbon is styrene and the polyalkenyl aromatic coupling agent is divinylbenzene.

5. The star block copolymer of claim 4 wherein the anionically polymerized arms contain at least one block of polystyrene and at least one block of a polydiene.

6. The star block copolymer of claim 5 wherein the diene is isoprene.

7. A process of making a star block copolymer of anionically polymerizable monomer(s) selected from the group consisting of vinyl aromatic hydrocarbons, conjugated dienes and mixtures thereof, and polydimethylsiloxane which comprises:

(a) anionically polymerizing the anionically polymerizable monomer(s) to produce living polymer arms,
   (b) reacting the living polymer arms of (a) with a polyalkenyl aromatic coupling agent to couple the arms thereto,
   (c) polymerizing the product of step (b) with hexamethylcyclotrisiloxane in the presence of a polar promoter, and
   (d) terminating the polymerization to produce a star block copolymer with the living polymer arms and polydimethylsiloxane arms radiating outwardly from the polyalkenyl aromatic coupling agent.

8. The process of claim 7 wherein step (a) is carried out at a temperature of from 0° to 100° C., step (b) is carried out at a temperature of from 40° to 100° C. and the molar ratio of divinylbenzene to living polymer arms is from 1:1 to 6:1, and wherein step (c) is carried out at a temperature of from 30° to 120° C. and the concentration of the hexamethylcyclotrisiloxane is from 1 to 25% by weight and the concentration of the polar promoter is from 100 ppm to essentially 100% by weight.

9. The process of claim 7 wherein the vinyl aromatic hydrocarbon is styrene and the polyalkenyl aromatic coupling agent is divinylbenzene.

10. The process of claim 7 wherein step (c) is carried out by first initiating the polymerization by adding a portion of the hexamethylcyclotrisiloxane to the product of step (b) and allowing reaction to proceed for 0.5 to 4 hours at 50° to 80° C. and then adding the remainder of the hexamethylcyclotrisiloxane and allowing the reaction to proceed to completion at 60° to 120° C. for 1 to 4 hours.

11. The process of claim 7 wherein the arms of (a) contain at least one conjugated diene.

12. The process of claim 11 wherein the diene is isoprene.

* * * * *